Aug. 16, 1932.   W. A. CHRYST   1,871,956
SHOCK ABSORBER
Filed Nov. 20, 1928
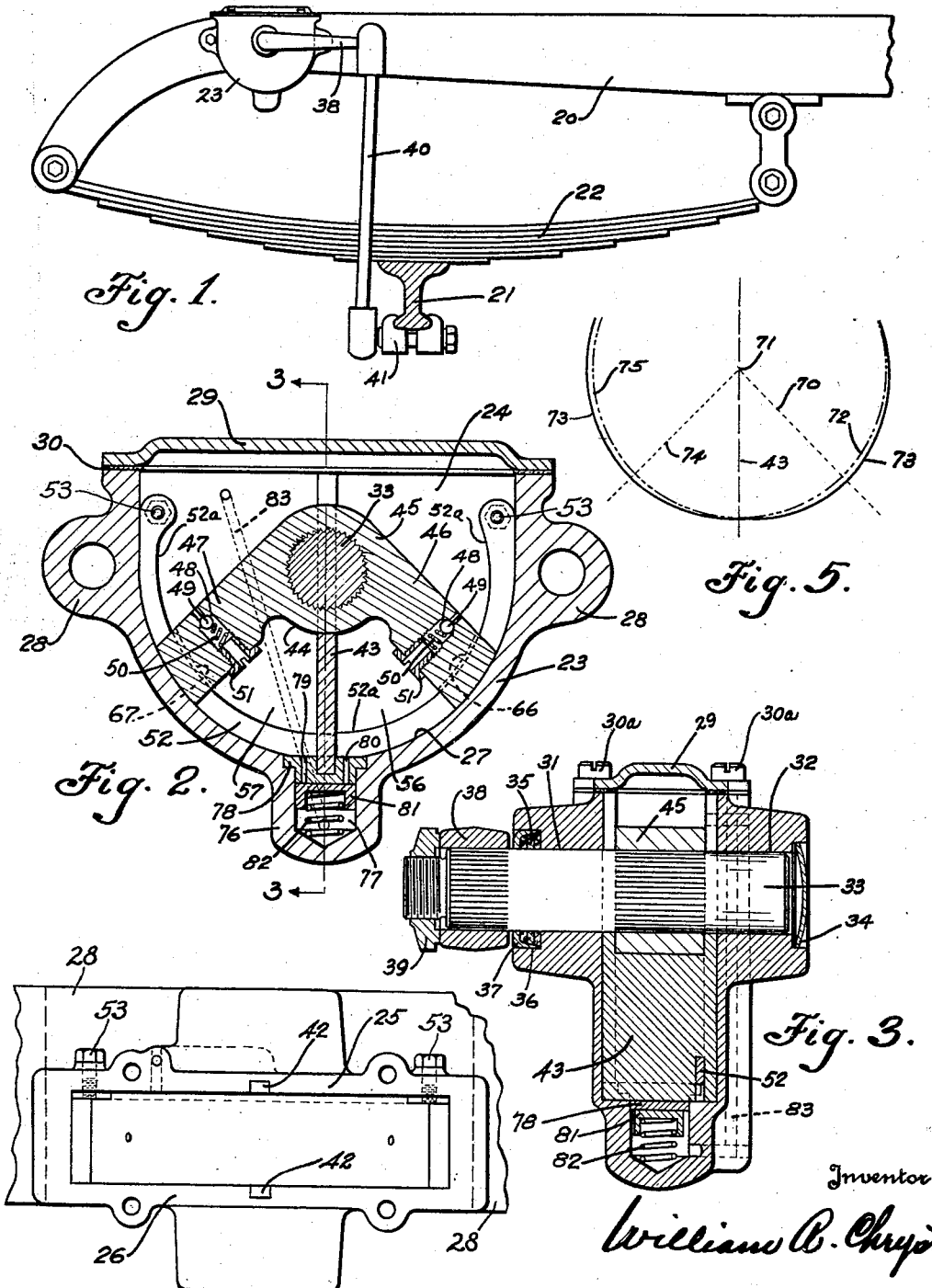

Patented Aug. 16, 1932

1,871,956

UNITED STATES PATENT OFFICE

WILLIAM A. CHRYST, OF DAYTON, OHIO, ASSIGNOR, BY MESNE ASSIGNMENTS, TO DELCO PRODUCTS CORPORATION, OF DAYTON, OHIO, A CORPORATION OF DELAWARE

SHOCK ABSORBER

Application filed November 20, 1928. Serial No. 320,700.

This invention relates to improvements in shock absorbers adapted to cushion the movement of two relatively movable members, for example the frame and axle of a vehicle.

It is among the objects of the present invention to provide a shock absorber of simple and compact construction, capable of resisting both the approaching and separating movements of the frame and axle of a vehicle, and by such resistance dissipate road shocks and prevent their transmission to the vehicle frame.

Further objects and advantages of the present invention will be apparent from the following description, reference being had to the accompanying drawing, wherein a preferred embodiment of one form of the present invention is clearly shown.

In the drawing:

Fig. 1 illustrates a front portion of the frame of an automotive vehicle supported by a spring upon the usual axle, a shock absorber embodying the present invention being shown applied thereto.

Fig. 2 is a sectional view taken longitudinally through the shock absorber.

Fig. 3 is a cross sectional view taken along the line 3—3 of Fig. 2.

Fig. 4 is a plan view of the shock absorber having its cover removed.

Fig. 5 is a diagrammatic view illustrating the variations in the size of the passages, providing for fluid restriction at different positions of the fluid displacement members.

Referring to the drawing, the numeral 20 designates the frame of the vehicle which is supported upon the usual axle 21 by springs 22, only one of which is shown.

The shock absorber comprises a casing 23 presenting a fluid reservoir 24, said casing having two walls 25 and 26 substantially parallel, and an arcuate wall 27. Apertured lugs 28, formed on the casing, provide means for mounting the shock absorber upon the frame 20. A cap 29 fitted with a gasket 30 forms a fluid-tight cover for the casing 23, said cap being secured to the casing by a plurality of screws 30a.

Casing 23 presents oppositely disposed and aligned bearing portions 31 and 32, in which is journalled the rocker shaft 33, one end of which extends outside the casing 23. In the end of the opening forming the bearing portion 32 there is fitted a disc 34 which substantially seals this opening against fluid leaks. A plurality of packing elements 35 surround the rocker shaft 33 and are located within a recess 36 formed in the one side of the casing 23, a packing gland 37 tightly fitting into said recess 36 and having provision for urging the packing elements 25 into sealing engagement with the rocker shaft 33, thereby substantially preventing fluid leaks through the bearing 31. The end of the shaft 33 extending outside the casing 23 has the shock absorber operating arm 38 secured thereto by the nut 39. The free end of arm 38 is swivelly connected with one end of a connecting rod 40, the other end of said rod being swivelly secured to a bracket 41 anchored to the axle 21.

The parallel walls 25 and 26 of the reservoir 24 are each provided with an interior groove 42 which extends from the upper edge of the casing to the arcuate wall 27, a cross-groove in said arcuate wall 27 connecting with the grooves 42. A fixed partition 43 has its edges fitting within the grooves 42 and the cross-groove in the arcuate wall 27, a portion of the partition 43 being cut away to provide an edge which engages with the arcuate edge 44 of the oscillatable fluid displacement member 45, supported upon the rocker shaft 33. Interlocking knurls are provided on both the displacement member and the shaft whereby relative rotation between these two elements is substantially prevented. The displacement member comprises two angularly arranged vanes 46 and 47, the ends of which are arcuated to coincide with and lie in close proximity to the arcuate wall 27 of the recess. Vanes 46 and 47 provide compression chambers 56 and 57, on opposite sides of the partition 43, respectively. Each vane 46 and 47 supports means for supplying fluid to the respective compression chambers in accordance with the direction of movement of the displacement member. This means comprises a passage having two portions of different transverse dimensions which present a valve seat 48 upon which the check-valve 49 is yieldably maintained by a spring 50, said spring being urged toward said check-valve by a hollow screw 51. In the arcuate end of each vane 46 and 47 there is provided a slot, the bottom surface of the slot in vane 46 being designated by the numeral 66 and the bottom surface of slot of vane 47 being designated by the numeral 67.

The means removably supported within the reservoir and cooperating with the slots in the displacement member vanes for providing fluid flow orifices adapted to establish a varying flow of fluid from the respective compression chamber in accordance with the position and the direction of movement of the displacement member 45, comprises a metering strap 52 secured at the ends by screws 53 extending through the wall of the casing. The metering strap extends through a slot provided in the partition 43 which slot is completely filled by said metering strap whereby to prevent a fluid flow from one compression chamber to the other via this slot. At this point it may be mentioned that the compression chamber 56 may be referred to as the "snubber" chamber and the compression chamber 57 as the "bumper" chamber. As shown in Fig. 2 the outer edge of the metering strap 52 is arcuated and fits against the arcuate wall 27 of the reservoir 24. The width, that is the dimensions from the edge of the strap 52 fitting against the arcuate wall 27 and the directly opposite edge 52a of the strap, varies, as can be seen in the Fig. 2. Adjacent the right end of the metering strap, as regards Fig. 2, this edge 52a lies a certain distance from the pivotal point of the displacement member 45, or more particularly the axial center of the rocker shaft 33. However, edge 52a gradually recedes from said pivotal center, reaching its greatest distance away from said center at a point substantially midway between said right end and the portion extending into the partition 43. From said midway point this edge 52a gradually approaches the pivotal point as partition 43 is approached. The left end of the metering strap, as regards Fig. 2, has the inner edge 52a thereof located a proper distance from the aforementioned pivotal point, said edge, however, gradually approaching the pivotal point of the displacement member as the partition 43 is approached. This is clearly illustrated in the Fig. 5. The dotted line designated by the numeral 70 shows the midway point on the right side of the strap at which the inner edge 52a is farthest removed from the pivotal point 71, the dot-and-dash lines 72 representing the path of travel of the bottom surface 66 of the slot in vane 46, while the solid line 73 represents the path of travel of the inner edge 52a of strap 52.

It will be seen that said inner edge 52a is comparatively close to the bottom surface 66 adjacent the right end of the strap and adjacent the partition 43, but midway they are more greatly separated. Line 74 designates the midway point between the left end of the strap and the partition 43. Adjacent the left end of the strap it will be seen that the dot-and-dash line 75, representing the path of travel of the bottom surface 67 of the slot of vane 47, is spaced a considerable distance from the path of travel of the inner edge 73 of the strap; however, said path of inner edge 73 gradually approaches the line 75 as the partition 43 is approached.

A lug 76 formed on the bottom of the casing is recessed, providing a chamber 77, the end of which has a plug 78. Said plug has a passage 79 providing communication between the chamber 77 and the "bumper" chamber 57, and another passage 80 which provides communication between the chamber 77 and the "snubber" chamber 56. Within the chamber 77 there is provided a valve 81, urged by a spring 82 into engagement with the inner end of plug 78, whereby communication between passages 79 and 80 is normally closed. A duct 83, provided in the casing 23, leads from chamber portion 77, back of valve 81, into the fluid reservoir, said duct preventing fluid from gathering behind valve 81, which would affect the operation of the said valve.

The operation of this device is as follows:

When the road wheels of the vehicle strike an obstruction in the roadway, spring 22 will be flexed toward the frame 20, causing the connections including bracket 41, connecting rod 40 and the operating arm 38 to rotate the rocker shaft 33 in a counter-clockwise direction whereby the fluid displacement member 45 will be likewise rotated. This rotation moves the vane 46 upwardly as regards Fig. 2 and the vane 47 downwardly. The vane 46 in moving upwardly, or more specifically, away from the partition 43, will permit fluid in the reservoir 24 to move its valve 49 from off the seat 48 and thus establish a substantially free flow of fluid into the "snubber" chamber 56. Vane 47, moving downwardly or toward the partition 43, will exert pressure upon the fluid within the "bumper" chamber 57, thus aiding in the tight closing of the valve 49 and thereby preventing fluid from escaping past said valve. Fluid will be forced through the orifice presented between the bottom surface 67 of the slot in the vane and the inner edge 52a of metering strap 52. As described before, as vane 47 moves toward the partition 43, this orifice will gradually be reduced, thus the fluid flow through said orifice will be restricted as the vane 47 approaches the partition 43. Such increase in restriction will, of course, increase the resistance of the fluid to the movement of the piston 47 and thus the flexing movement of spring 22 toward the frame 20 will be resisted increasingly as said spring approaches the frame 20.

When the spring has reached the limit of flexure caused by the obstruction in the roadway, the tendency is for it to return to its normal position, suddenly, and with a rebounding movement, such a return resulting in jars and jolts being transmitted to the frame 20. However, the present invention provides for an immediate check of the return of the spring toward its normal position. As the flexed position of spring 22, which movement of the spring has moved vane 46 toward the right end of the strap 52, the orifice between the bottom surface 66 of the slot in said vane 46 and the inner edge 52a of the metering strap 52 is comparatively small, thus the restriction to the flow of fluid will be substantially high. This is illustrated in Fig. 5 by the lines 72 and 73. As the vane 46 is moved toward the partition 43, by the return movement of spring 23, toward the unflexed position, the size of the orifice between surfaces 66 and the inner edge 52a will gradually be increased until the vane 46 reaches substantially the intermediate normal position in which position the piston is shown in Fig. 2, at which time said orifice will have attained its greatest dimensions. From this point in the movement of the vane 46, and as it approaches the piston 43, said orifice will gradually be reduced. Thus as vane 46 moves toward the partition 43 and exerts pressure upon the fluid within the snubber chamber 56, the fluid flow from said chamber through the said orifice will at first be restricted decreasingly, and then increasingly, consequently such movement of the vane 46 is resisted decreasingly, and then increasingly.

From this it may be seen that the spring 22 in returning from its flexed to its normal position and perhaps to points beyond its normal position, will be resisted at first decreasingly and then increasingly, consequently the rebounding of the spring is substantially prevented and the consequent jars and jolts practically eliminated.

Pressures within the chambers 56 and 57 exceeding a proper value are relieved by the movement of valve 81 away from the plug 78 whereby communication between said compression chambers 56 and 57 is established. When an excessive pressure is built up within one or the other of these chambers, it is relieved by fluid flowing through passages 79—80 into the opposite chamber. If fluid were permitted to gather behind valve 81 it would become fluid logged and would not move to provide communication between the compression chambers when such excessive pressures occurred. To avoid this, duct 83 connects the space behind valve 81 with the reservoir so that as the piston 81 moves downwardly into the chamber 77, fluid therein may be forced out through passage 83 into the fluid reservoir 24. If it is desired to vary the resistance of the shock absorber, the cover cap 29 may be taken off, screws 53 may be removed and another metering strap be substituted therefor.

Applicant has provided a shock absorber of reduced proportions, capable of efficiently controlling the approaching and separating movements of the frame and axle to avoid the jars and jolts from being transmitted to the frame of the vehicle, said shock absorber requiring a minimum expenditure of time and labor for its commercial production.

While the form of embodiment of the present invention as herein disclosed, constitutes a preferred form, it is to be understood that other forms might be adopted, all coming within the scope of the claims which follow.

What is claimed is as follows:

1. A shock absorber, comprising in combination, a casing presenting a fluid reservoir; a fixed partition within said reservoir; an oscillatable fluid displacement member within said casing providing a compression chamber on each side of the partition; pressure actuated means for supplying fluid to the respective compression chambers in response to the movement of the displacement member in a direction to increase the cubical contents of the respective chamber; means removably supported within the reservoir and cooperating with the displacement member for providing fluid flow orifices adapted to establish a variable flow of fluid from the respective compression chambers in accordance with the position and the direction of movement of the displacement member, and a spring-loaded pressure release valve adapted to provide communication between said chamber in response to excessive pressures in either of said chambers.

2. A shock absorber, comprising in combination, a casing; a fixed partition therein; oscillating vanes cooperating with said partition to form two compression chambers; means adapted to supply fluid to the respective chambers in accordance with the direction of movement of the oscillating vanes; a metering element removably supported within the casing and cooperating with the oscillating vanes to provide fluid flow orifices adapted to establish a variably restricted flow of fluid from the respective chambers in accordance with the direction of movement of the respective vanes; a passage providing communication between the two compression chambers; and a spring-loaded valve yieldably maintaining said passage closed against fluid flow at pressures below a proper degree.

3. A shock absorber comprising, in combination, a casing; a fixed partition therein; oscillating vanes cooperating with said partition to form the compression chambers; means adapted to supply fluid to the respective chambers in accordance with the direction of movement of the oscillating vanes; means removably supported within the casing and adapted to cooperate with one of the oscillatable vanes to establish an increasingly restricted flow of fluid from the one compression chamber as said vane moves from its one extreme position toward the partition, said means cooperating with the other vane to establish a decreasingly restricted flow of fluid from the other compression chamber as said vane moves from its one extreme position through a portion of its range of travel toward the partition and then an increasingly restricted flow through the final part of its range of movement toward the partition, and a spring loaded pressure release valve providing communication between the two compression chambers to assist the aforementioned fluid flow means to relieve fluid pressure when said pressure becomes excessive.

4. A shock absorber comprising, in combination, a casing; a fixed partition therein; oscillating vanes cooperating with said partition to form two compression chambers; means carried by the vanes for supplying fluid to the respective chambers in accordance with the direction of movement of the respective vanes; means supported within the casing and cooperating with the respective vanes for establishing a restricted flow of fluid from the compression chambers in accordance with the position and the direction of movement of the said respective vanes; a recess in said casing, provided with a plug having apertures providing communication between the respective compression chambers and said recess; a valve in said recess yieldably urged to shut off communication between said apertures; and a duct connecting the interior of the casing outside of the compression chambers with the space in the recess behind the spring urged valve.

5. A shock absorber comprising, in combination, a casing providing a fluid reservoir; a fixed partition within said reservoir; a fluid displacement member pivotally supported within said casing and cooperating with the partition to form compression chambers, within said casing; means for supplying fluid to the compression chambers as the displacement member moves to increase the cubical capacity of said chambers; a groove in the displacement member; a metering strip provided in the casing, said strip extending into the groove of the displacement member, the surface of the strip adjacent the pivotal point of the said member being eccentric to said pivotal point, a valve chamber; ducts connecting said valve chamber with the respective compression chambers; and a spring loaded valve normally closing said ducts.

6. A shock absorber comprising, in combination, a casing providing a fluid reservoir; a fixed partition within said reservoir; a fluid displacement member pivotally supported within said casing and cooperating with the partition to form compression chambers within said casing; means for supplying fluid to the compression chambers as the displacement member moves to increase the cubical capacity of said chambers; a groove in the displacement member; a metering strip provided in the casing, said strip extending into the groove of the displacement member, two surfaces of the strip slidably engaging corresponding surfaces of the groove at substantially all positions of the fluid displacement member, the other surface of said strip providing a variable space between it and the corresponding surface of said member whereby a variable orifice is provided connecting the fluid reservoir and compression chamber to relieve pressures within predetermined limits; and a spring loaded pressure release valve adapted to assist said variable pressure release orifice to relieve the compression chambers at pressures exceeding said predetermined pressures.

In testimony whereof I hereto affix my signature.

WILLIAM A. CHRYST.